United States Patent [19]
Saito et al.

[11] Patent Number: 5,948,327
[45] Date of Patent: Sep. 7, 1999

[54] LENS INJECTION-COMPRESSION-MOLDING METHOD

[75] Inventors: Kiyohiro Saito; Hiroshi Asami, both of Tokyo, Japan

[73] Assignee: Hoya Corporation, Tokyo, Japan

[21] Appl. No.: 08/832,656

[22] Filed: Apr. 4, 1997

[30] Foreign Application Priority Data

Apr. 5, 1996 [JP] Japan .................................. 8-083720

[51] Int. Cl.$^6$ .................................................... B29D 11/00
[52] U.S. Cl. ........................ 264/2.2; 264/328.7; 425/808
[58] Field of Search .............................. 264/1.1, 2.2, 2.3, 264/328.7, 328.8, 328.13; 425/808

[56] References Cited

U.S. PATENT DOCUMENTS

| | | | |
|---|---|---|---|
| 4,184,835 | 1/1980 | Talbot | 425/577 |
| 4,364,878 | 12/1982 | Laliberte et al. | 264/2.2 |
| 4,828,769 | 5/1989 | Maus et al. | 264/1.3 |
| 4,900,242 | 2/1990 | Maus et al. | 425/149 |

FOREIGN PATENT DOCUMENTS

| | | |
|---|---|---|
| 0 244 783 | 2/1991 | European Pat. Off. . |
| 54-148055 | 11/1979 | Japan . |
| 61-66623 | 4/1986 | Japan . |
| 5-30608 | 5/1993 | Japan . |
| 5-44893 | 7/1993 | Japan . |
| 7-27140 | 6/1995 | Japan . |

OTHER PUBLICATIONS

George Galic's letter to German Patent Agent dated Nov. 10, 1997 (2 pages); including an Affidavit to the European Patent Office dated Nov. 7, 1997 (7 pages).

SPIE–The International Society for Optical Engineering Reprinted from Ophthalmic Lens Design and Fabrication vol. 1529—Dated Jul. 25–26, 1991 (pp. 13–21) Improved Plastic Molding Technology For Ophthalmic Lens & Contact Lens by George Galic and Steve Maus.

Optical World; Injection–compression moulding of Rx polycarbonate lenses by George Galic (4 pages).

Engel Information; Sandwich Press Injection (10 pages).

*Primary Examiner*—Mathieu D. Vargot
*Attorney, Agent, or Firm*—Flynn, Thiel, Boutell & Tanis, P.C.

[57] ABSTRACT

In an injection step, actual injection speed V is closed-controlled so that the actual injection speed V becomes equal to first or second preset speed $V_1$ or $V_2$ while comparing the actual injection speed V with the first or second preset speed $V_1$ or $V_2$ in the section between $S_0$ and $S_1$ from the time when injection of molten resin is started up to the time when the molten resin reaches this side of a gate portion 46 or the section between $S_1$ and $S_2$ from the time when the molten resin reaches this side of the gate portion 46 up to the time when the molten resin reaches the inside of a cavity 3. The injection speed V is open- controlled to third preset speed $V_3$ in the section between $S_2$ and $S_3$ from the time when the molten resin reaches the inside of the cavity 3 up to the time when injection of the molten resin is completed. Because a high injection speed can be secured and an injection speed change can be decreased, it is possible to decrease the frequency of a feed history appearing on the surface of a molded product.

11 Claims, 6 Drawing Sheets

F I G. 1
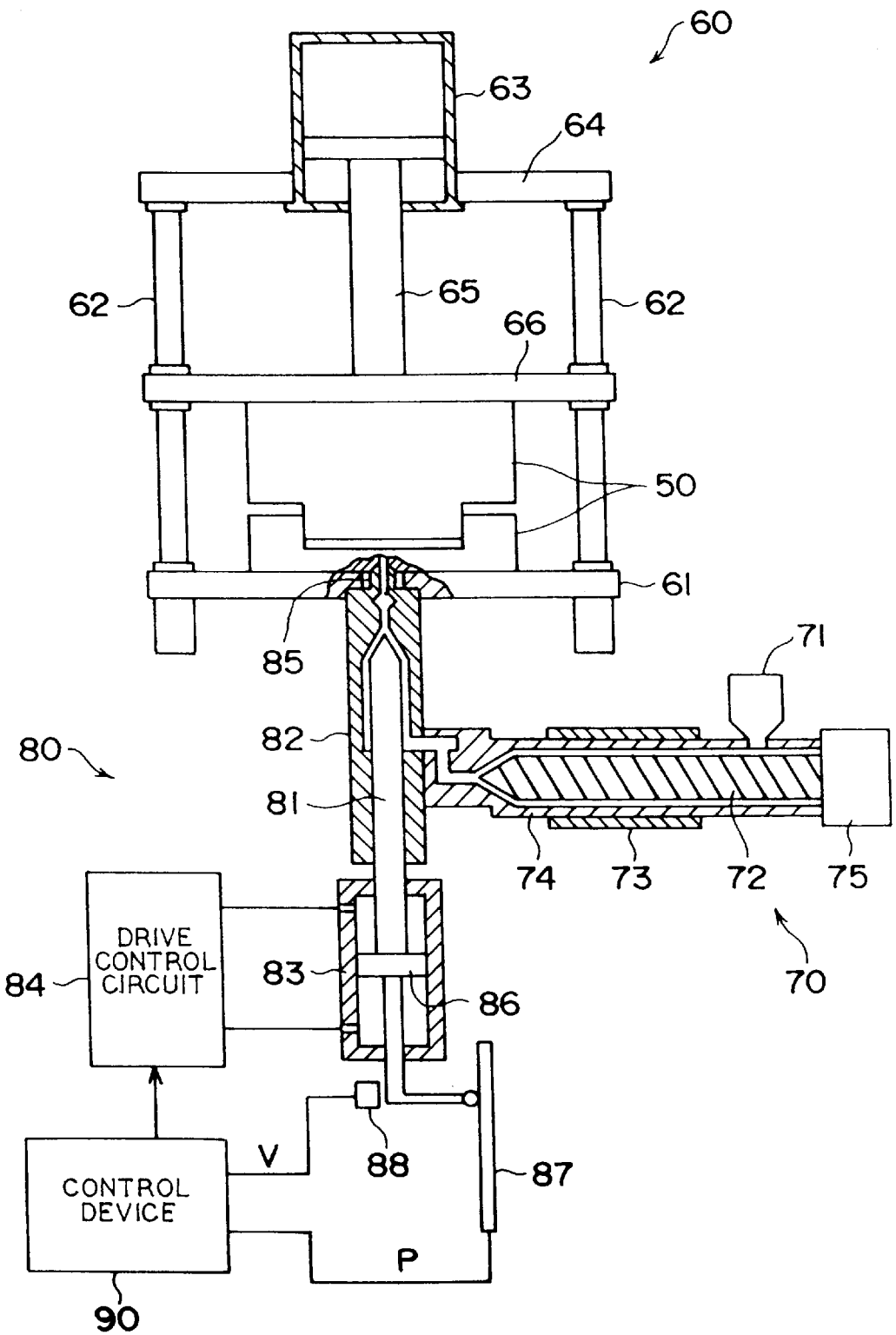

F I G. 2
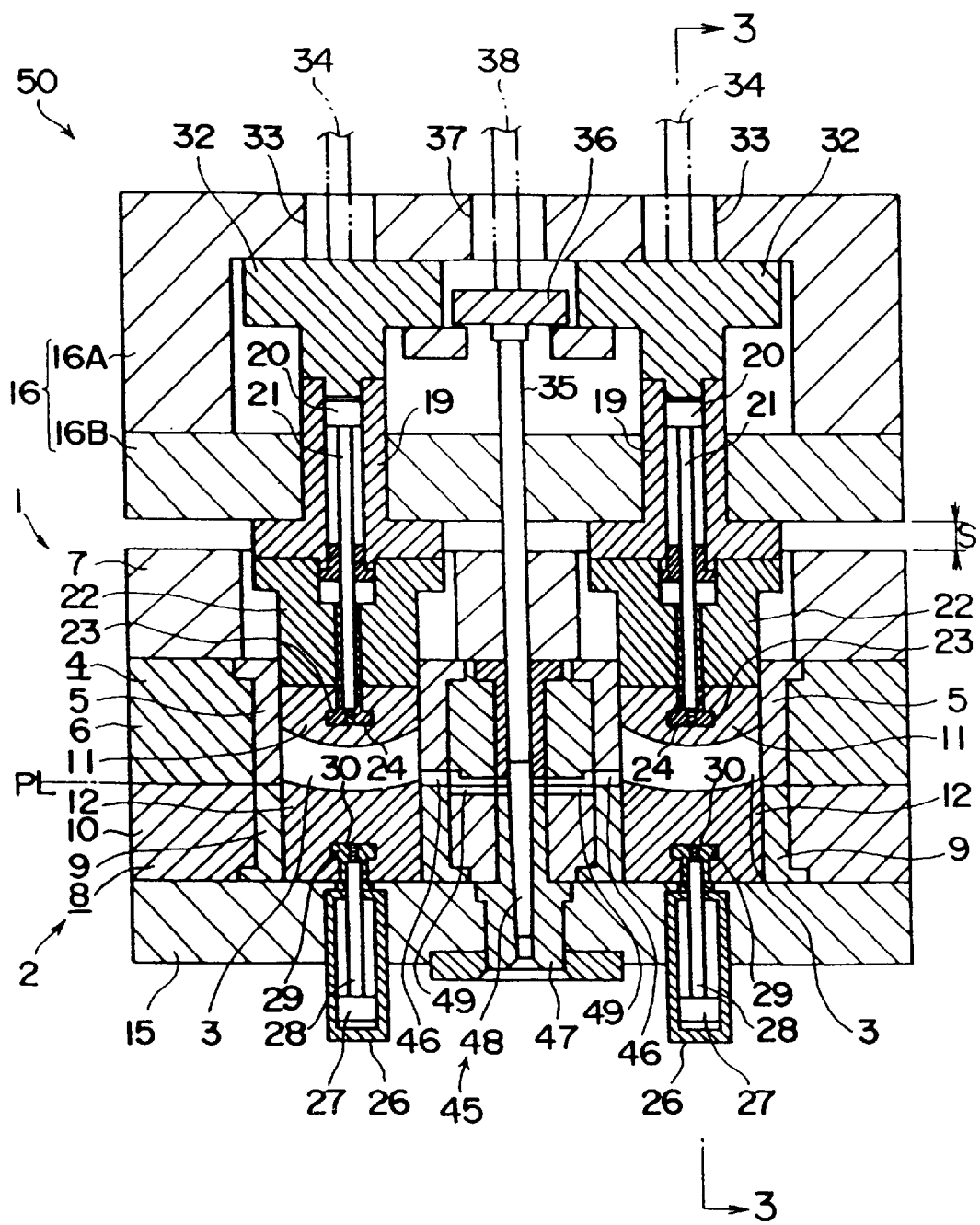

LENS INJECTION-COMPRESSION-MOLDING METHOD

BACKGROUND OF THE INVENTION

1. Field of the Invention

The present invention relates to a lens injection-compression-molding method for injection-molding a thermoplastic resin to form a lens (mainly, a spectacle lens). More particularly, the present invention relates to a lens injection- compression-molding method capable of forming a lens at a high accuracy and a high quality.

2. Description of Related Art

An injection compression molding method is known as a method for forming a spectacle lens from a thermoplastic resin.

The injection compression molding method is a method of obtaining a spectacle lens by correcting the shrinkage of molten resin, clamping a die by leaving a margin for compression in a cavity for forming the spectacle, lens in order to obtain a uniform and high shape accuracy, then injecting molten resin into the cavity for forming the spectacle lens, and thereafter compressing the margin for compression.

To obtain a high-quality lens by the above injection compression molding method, it is important to control the position and speed of molten resin in the injection process. That is, it is important to accurately detect that the molten resin reaches the inside of a lens forming cavity and injecting the molten resin at a high speed and a constant speed. This is because, if the molten resin reaches the inside of the lens forming cavity and then the speed of the resin extremely changes in the cavity, the speed change in the cavity easily appears on the surface of a molded product as a wavy feed history.

Use of the closed control has been attempted so far to control the position and speed of molten resin in the injection process. That is, a method of detecting an actual injection speed to closed-control an injection speed while comparing the actual speed with a preset speed so that the deviation between the speeds is decreased to zero has been attempted.

In the case of lens formation, however, a time lag easily occurs between the movement of molten resin and a control system because an injection resistance is increased due to the shape of a lens or the flow property of molten resin.

Therefore, when using the closed control for all processes as ever, a problem occurs that an injection speed change easily appears on the surface of a molded product as a feed history because an injection speed is controlled so as to fluctuate little by little so that the deviation between an actual injection speed and a preset speed is decreased to zero.

The present invention is made to solve the conventional problem and its object is to provide a lens injection-compression-molding method making it possible to obtain a high-accuracy and high-quality lens.

SUMMARY OF THE INVENTION

The first injection compression molding method of the present invention is a lens injection- compression-molding method of injecting molten resin into a molding body having at least one lens forming cavity, a runner communicating with the cavity, and a sprue communicating with the runner by an injection cylinder and moreover compression-molding the molten resin to form a lens, which is characterized by controlling the injection speed of the injection cylinder while comparing an actual injection speed of the injection cylinder with a preset speed in the section from the time when injection of the molten resin is started up to the time when the molten resin reaches the inside of the lens forming cavity so that the actual injection speed of the injection cylinder becomes equal to the preset speed and controlling the injection speed of the injection cylinder to the preset speed in the section from the time when the molten resin reaches the inside of the lens forming cavity up to the time when injection is completed.

According to the above injection compression molding method, it is possible to accurately inject molten resin up to a position where the molten resin reaches the inside of a lens forming cavity because of controlling the injection speed of an injection cylinder while comparing an actual injection speed of the injection cylinder with a preset speed so that the actual injection speed of the injection cylinder becomes equal to the preset speed, that is, because of using the closed control.

Moreover, because of controlling the. injection speed of the injection cylinder to the preset speed in the section from the time when the molten resin reaches the inside of the lens forming cavity up to the time when the injection is completed, that is, because of using the open control, it is possible to reduce a speed change of the molten resin n the lens forming cavity. Therefore, it is possible to decrease the frequency of the phenomenon in which a feed history appears on the surface of a molded product.

The second injection compression molding method of the present invention is a lens injection- compression-molding method of injecting molten resin into a molding body having at least one lens forming cavity, a runner communicating with the cavity through a gate portion, and a sprue communicating with the runner and moreover, compression-molding the resin to form a lens, which is characterized by controlling the injection speed of the injection cylinder while comparing an actual injection speed of the injection cylinder with a preset speed in the section from the time when the injection of the molten resin is started up to the time when the molten resin reaches in the gate portion so that the actual speed of the injection cylinder becomes equal to the preset speed and controlling the injection speed of the injection cylinder to the preset speed in the section from the time when the molten resin reaches the inside of the lens forming cavity up to the time when the injection is completed.

According to the above injection compression molding method, it is possible to accurately inject molten resin up to a position where the molten resin reaches a gate portion because the close control is used in the section from the time when injection of the molten resin is started up to the time when the molten resin reaches the gate portion and moreover, it is possible to decrease a speed change of the molten resin in a lens forming cavity and the frequency of the phenomenon in which a feed history appears on the surface of a molded product because the open control is used in the section from the time when the molten resin reaches the inside of the lens forming cavity up to the time when the injection is completed.

In this case, it is preferable to control the injection speed of an injection cylinder in the section from the time when the molten resin reaches the inside of the lens forming cavity up to the time when injection of the molten resin is completed so that the injection speed is higher than the injection speed of the injection cylinder in the section from the time when the injection of the molten resin is started up to the time when the molten resin reaches the gate portion.

Thus, because the molten resin is fed at a low speed up to a position where the molten resin reaches the gate portion, it is possible to accurately inject the molten resin up to the position of the gate portion. Moreover, it is possible to decrease the frequency of the phenomenon in which a feed history appears because the molten resin is fed at a high speed after it reaches the inside of the lens forming cavity.

Furthermore, though either closed control or open control can be used in the section from the time when the molten resin reaches the position of the gate portion up to the time when the molten resin reaches the inside of the lens forming cavity, that is, in the gate portion section, it is preferable to adjust an injection amount of the resin by temporarily lowering the injection speed of the injection cylinder up to a predetermined speed.

Thus, it is possible to prevent the molten resin from suddenly entering the cavity because the injection speed of the molten resin is temporarily lowered and under this state, the resin enters the cavity. Therefore, it is possible to compensate smooth injection of the molten resin in which the mount of suction air is minimized and the behavior of the molten resin is not greatly changed.

When forming a minus lens, the central portion of a cavity has a large flow resistance because the thickness of the central portion of the lens is smaller than that of the peripheral portion of the lens from the viewpoint of the property of the lens shape. Therefore, because molten resin injected into the cavity does not easily flow through the central portion of the cavity and thus, its flow is divided and enters the cavity from the peripheral portion, there is a property that a weld mark easily occurs at the central portion. Therefore, special attention must be paid for a feed history.

The present applicant previously proposed an injection compression molding method of forming a lens by setting a compression margin for forming a minus lens to a value larger than a compression margin for forming a plus lens (Japanese Patent Application No. 315406/1995). Thereby because the compression margin for forming a minus lens is set to a value larger than the compression margin for forming a plus lens, the flow of molten resin reaching the inside of a cavity is not divided even when forming a minus lens but it enters the peripheral portion of the cavity by passing through the central portion of the cavity. Therefore, it is possible to inhibit a weld mark from occurring at the central portion.

The third injection compression molding method of the present invention makes it possible to decrease an injection speed change while securing a high injection speed by assuming that a compression margin for forming a minus lens is set to a value larger than a compression margin for forming a plus lens and an injection resistance is also decreased and moreover, using the open control in the section from the time when molten resin reaches the inside of a cavity up to the time when injection of the molten resin is completed.

Specifically, the third method is a lens injection-compression-molding method of forming a lens by setting a molding body having at least one lens forming cavity, a runner communicating with the cavity, and a sprue communicating with the runner in an injection molding die, injecting molten resin into the molding body by an injection cylinder and moreover compression-molding the molten resin, which is characterized by setting a compression margin for forming a minus lens to a value larger than a compression margin for forming a plus lens, controlling the injection speed of an injection cylinder so that an actual injection speed of the injection cylinder becomes equal to a present speed while comparing the actual injection speed of the injection cylinder with the preset speed in the section from the time when injection of the molten resin is started up to the time when the molten resin reaches the inside of the lens forming cavity, and controlling the injection speed of the injection cylinder to the preset speed in the section from the time when the molten resin reaches the inside of the lens forming cavity up to the time when injection of the molten resin is completed at the time of formation of the minus lens.

According to the above injection compression molding method, it is possible to decrease an injection speed change while securing a high injection speed because of controlling the injection speed of an injection cylinder to a preset speed in the section from the time when molten resin reaches the inside of a lens forming cavity up to the time when injection of the molten resin is completed, that is, because the open control is used by assuming that a compression margin is set to a large value and an injection resistance is also decreased at the time of formation of a minus lens. Therefore, it is possible to decrease the frequency of the phenomenon in which a feed history appears on the surface of a molded product.

In this case, it is preferable to control the injection speed of the injection cylinder so that an actual injection speed of the injection cylinder becomes equal to the preset speed while comparing the actual injection speed of the injection cylinder with the preset speed in the section from the time when the molten resin reaches the inside of the lens forming cavity up to the time when injection of the molten resin is completed at the time of formation of a plus lens.

When forming a plus lens, a compression margin is small and a gate structure narrowed to prevent a sink mark from occurring on a gate portion is used, a injection resistance is very large and therefore, it is estimated that a high injection speed cannot be obtained and a high-quality molded product cannot be obtained when using the open control. However, by using the above closed control, it is possible to secure a high injection speed.

In the above case, it is preferable to control the injection speed of the injection cylinder so that the injection speed differs in forming a minus low power lens and a minus high power lens and moreover, make the injection speed for forming the minus high power lens lower than that for forming the minus low power lens. In this case, the minus high power lens is a lens of −4.00 D or more. Thus, even when forming a minus high power lens having a difference between the thickness of the central portion and the thickness of the marginal portion larger than the case of forming a minus low power lens, it is possible to decrease a speed change of the molten resin in a lens forming cavity. Therefore, it is possible to decrease the frequency of the phenomenon in which a feed history appears on the surface of a molded product.

Moreover, it is preferable to set a compression margin for forming a minus lens by clamping an injection molding die from an initial position where the compression margin in a cavity is maximum up to a position where a set compression margin is left.

As described above, it is necessary to set a compression margin for forming a minus lens to a value larger than a compression margin for forming a plus lens. In this case, however, if a compression margin for forming a minus lens is set by clamping an injection molding die from the initial position where the compression margin in a cavity is maximum up to a position where the compression margin is decreased to zero and thereafter, opening the injection molding die by a value equivalent to the above set compression margin, the distance for opening the injection molding die by a value equivalent to the set compression margin is increased and therefore, the efficiency is temporally lowered. Therefore, to solve the above problem, it is necessary to set a compression margin for forming a minus lens by clamping an injection molding die from an initial position where the compression margin in the cavity is maximum up to a position where a set compression margin is left.

Moreover, when forming a minus lens, it is preferable to start compressing a set compression margin before injection of molten resin is completed.

If a compression margin for forming a minus lens is set to a value larger than a compression margin for forming a plus lens, flow of molten resin stops while leaving a large unfilled portion in a cavity when injection of the molten resin is completed and thereby, a feed history called a flow mark easily occurs at the critical portion between a filled potion and an unfilled portion of a lens molded after the pressuring process. However, when staring the compression of a set compression margin before the injection of the molten resin is completed, the volume of the cavity is reduced before injection of the molten resin is completed and therefore, the flow property of the molten resin is improved and a large unfilled portion is rarely left in the cavity when injection of the molten resin is completed. Thus, it is possible to prevent a flow mark from occurring.

BRIEF DESCRIPTION OF THE DRAWINGS

FIG. 1 is an illustration showing an injection compression molding equipment for an embodiment of the present invention;

FIG. 2 is a sectional view showing an injection molding die for the above embodiment;

DETAILED DESCRIPTION OF THE PREFERRED EMBODIMENT(S)

Figure 3:
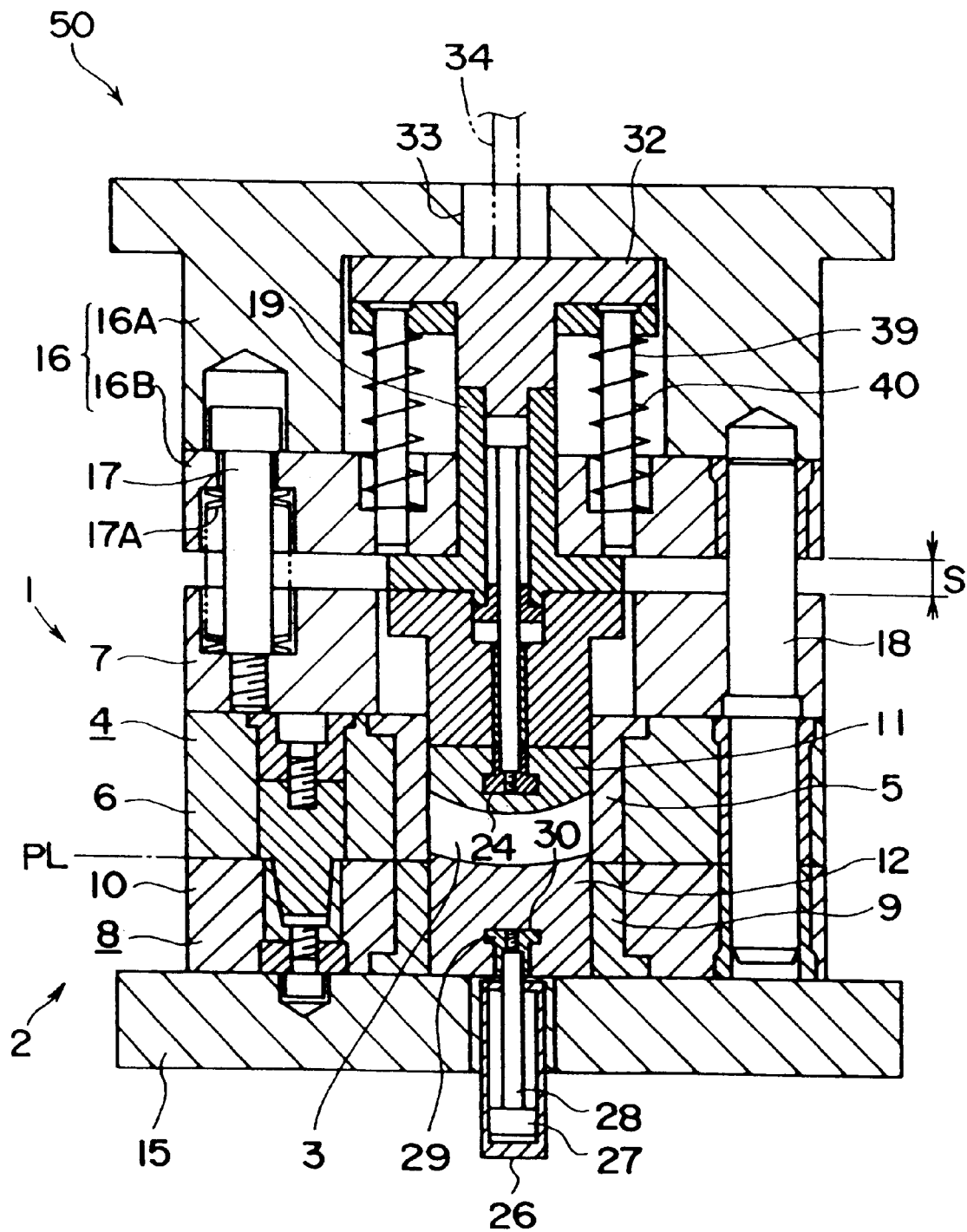
FIG. 3 is a sectional view of the die in FIG. 2, taken along the line III—III in FIG. 2.

An embodiment of the present invention is described below in detail by referring to the accompanying drawings.

FIG. 1 shows an injection compression molding equipment used for the lens (meniscus-shaped spectacle lens) injection compression molding method of this embodiment. The material of the spectacle lens formed by the equipment uses a thermoplastic resin such as PMMA (poly methyl methacrylate) or PC (polycarbonate).

The injection compression molding equipment comprises a clamping device 60 having an injection molding die 50, a plasticizing device 70 for plasticizing a material resin, an injection device 80 for weighing the molten resin and injecting the molten resin into the injection molding die 50, and a control device 90.

The clamping device 60 comprises a fixed die plate 61, a cylinder fixing plate fixed to the fixed die plate 61 through a plurality of tie bars 62 and mounting a clamping cylinder 63, and a movable die plate 66 vertically movably set along the tie bars 62 and connected to a piston rod 65 of the clamping cylinder 63. The injection molding die 50 is set between the fixed die plate 61 and the movable die plate 66.

The plasticizing device 70 comprises a plasticizing cylinder 74 for plasticizing a material resin supplied from a hopper 71 while sending the resin by a screw 72. The screw 72 is rotated by a hydraulic motor 75.

The injection device 80 comprises an injection cylinder 82 including a plunger 81, a hydraulic cylinder 83 for sliding (vertically moving) the plunger 81 of the injection cylinder 82, and a drive control circuit 84 for controlling the oil pressure to be supplied to the hydraulic cylinder 83 and controlling driving operations (including speed). A nozzle 85 is set to the front end (top) of the injection cylinder 82. A position sensor 87 and a speed sensor 88 for detecting position P and speed V of a piston 86 of the hydraulic cylinder 83 (plunger 81 of the injection cylinder 82) are set to the bottom of the hydraulic cylinder 83.

The control device 90 controls the drive control circuit 84 in accordance with signals P and V sent from the position sensor 87 and the speed sensor 88.

FIG. 2 is a sectional view of the injection molding die 50 and FIG. 3 is a sectional view of the die 50 in FIG. 2, taken along the line III—III in FIG. 2. The injection molding die 50 is provided with an upper die (movable die) 1 and a lower die (fixed die) 2 divided at a parting line PL as shown in FIG. 2 and two spectacle-lens forming cavities 3 and a runner 49 communicating with these two spectacle-lens forming cavities through a gate portion 46 is formed between the upper and lower dies. A sprue 48 formed by a sprue bushing 47 is formed perpendicularly to the runner 49. A molding body 45 is formed there which has two spectacle-lens forming cavities 3, gate portion 46, and sprue 48.

The die body 4 of a upper die 1 comprises an insert guide member 5 and die plates 6 and 7. The die body 8 of a lower die 2 comprises an insert guide member 9 and a die plate 10. An insert guide 11 and an lower die insert 12 for forming the cavity 3 are set in the insert guide members 5 and 9 so that they can slide perpendicularly to the parting line PL.

The die body 8 of the lower die 1 is fixed to a mold attaching member 15 fixed to the fixed die plate 61. The die body 4 of the upper die 1 is connected to a mold attaching member 16 comprising a upper member 16A and a lower member 16B by a bolt 17 shown in FIG. 3 and a coned disk spring 17A inserted into the outer periphery of the bolt 17 is set between the die body 4 and the mold attaching member 16. The mold attaching member 16 is fixed to the movable die plate 66 so that a downward clamping force of the clamping cylinder 63 works on it.

A space S is formed between the die body 4 and the mold attaching member 16 so that the die body 4 and the mold attaching member 16 are vertically opened or closed by the value equivalent to the space S while being guided by a guide pin 18. Moreover, a not-illustrated slight-opening cylinder is set under the mold attaching member 15 and the space S is formed because the mold attaching member 16 is raised by the slight-opening cylinder against the clamping force of the clamping cylinder 63.

A downward hydraulic cylinder 19 is set to the mold attaching member 16 so that the cylinder 19 can be vertically moved. A piston rod 21 connected to a piston 20 of the hydraulic cylinder 19 passes through a back insert 22 fixed to the bottom of the cylinder 19 and has a T-shaped cramp member 23 at its front end. The T-shaped cramp member 23 is removably engaged with a T-shaped groove 24 formed on the top end face of the insert guide 11.

The mold attaching member 15 is provided with an upward hydraulic cylinder 26. A piston rod 28 connected to a piston 27 of the hydraulic cylinder 26 passes through the mold attaching member 15 and has a T-shaped cram member 29 at its front end. The T-shaped cramp member 29 is removably engaged with a T-shaped groove 30 formed on the bottom end face of the lower die insert 12.

A pressure receiving member 32 is fixed to the top end of the hydraulic cylinder 19. When the pressure receiving member 32 is lowered by an ejector rod 34 inserted through a hole 33 formed on the mold attaching member 16 the hydraulic cylinder 19, back insert 22, and insert guide 11 are also lowered and a lens formed by the cavity 3 is protruded when the upper die 1 and the lower die 2 are separated.

An ejector pin 35 is vertically movably set to the centers of the upper die 1 and the mold attaching member 16. A pressure receiving member 36 is fixed to the top end of the ejector pin 35. When the pressure receiving member 36 is lowered by an ejector pin 38 inserted through a hole 37 formed on the mold attaching member 16, the ejector pin 35 is lowered.

The spring force of a spring 40 wound around an eject return pin 39 upward works on the pressure receiving member 32. Though not illustrated, the spring force of the spring wound around the eject return pin also works on the pressure receiving member 36 upward. Therefore, when the ejector rods 34 and 38 rise, the pressure receiving members 32 and 36 also rise to return to the original positions.

Then, functions of this embodiment are described below.

First, the insert guide 11 and lower die insert 12 are replaced in accordance with the type of the lens to be formed. The insert guide 11 and lower die insert 12 are replaced by raising the upper die 1 including the mold attaching member 16 to remove it from the lower die 2. By lowering the piston rod 21 of the hydraulic cylinder 19 and raising the piston rod 28 of the hydraulic cylinder 26, T-shaped cramp members 23 and 29 set to the front ends of the piston rods 21 and 28 are made to protrude from the insert guides 5 and 9 respectively.

The insert guide 11 and lower die insert 12 to be newly set to the die bodies 4 and 8 of the upper die 1 and the lower die 2 are horizontally moved while holding them by a not-illustrated robot arm to engage the T-shaped groove 24 and 30 of the insert guide 11 and the lower die insert 12 with the T-shaped cramp members 23 and 29. Thereafter, the piston rod 21 of the hydraulic cylinder 19 is raised to move the insert guide 11 upward and moreover, the piston rod 28 of the hydraulic cylinder 26 is lowered to move the insert 21 upward. Thereby, the insert guide 11 and lower die insert 12 are fitted to the insert guide members 5 and 9.

Thus, the present insert is replaced with an insert having the cavity 3 with the central portion thickness larger than the peripheral portion thickness to form a plus lens and with an insert having the cavity 3 with the central portion thickness smaller than the peripheral portion thickness to form a minus lens respectively.

To form a lens, dies are closed in the states shown in FIGS. 2 and 3. That is, the upper die 1 is lowered by the clamping cylinder 63, the die plate 6 of the upper die 1 contacts the die plate 10 of the lower die 2, and the dies are closed so that the coned disk spring 17A is not compressed. Under the above state, the space S is set to the maximum slight-opening degree.

Then, a slight-opening degree (compression margin) is set. In this case, a slight-opening degree S of 0.8 mm or less is set to form a plus lens. To form a minus lens, a slight-opening degree S of more than 0.8 mm is set. That is, a compression margin for forming a minus lens is set to a value larger than a compression margin for forming a plus lens.

When a plus lens is formed, that is, when a slight-opening degree S of 0.8 mm or less is set, the mold attaching member 16 is further lowered by a clamping cylinder (in this case, the coned disk spring 17A is compressed) to completely eliminate the space S and thereafter, the mold attaching member 16 is raised by a slight-opening cylinder against the spring force of the clamping cylinder by the set slight opening degree to set the slight-opening degree S.

When a plus lens is formed, that is, when a slight-opening degree S larger than 0.8 mm is set, the mold attaching member 16 is lowered by a clamping cylinder up to a position when the set slight-opening degree S is left (in this case, the coned disk spring 17A is compressed) to stop the member 16 at the position and set the slight-opening degree S. Thereby, it is possible to quickly and efficiently set a compression margin even when forming a minus lens. Then, a molted resin plasticize by the plasticizing device 70 is injected into the cavity 3 by the injection cylinder 82 of the injection device 80 through the nozzle 85, sprue 48, runner 49, and gate portion 46 while measuring the molten resin by the cylinder 82.

Figure 4:
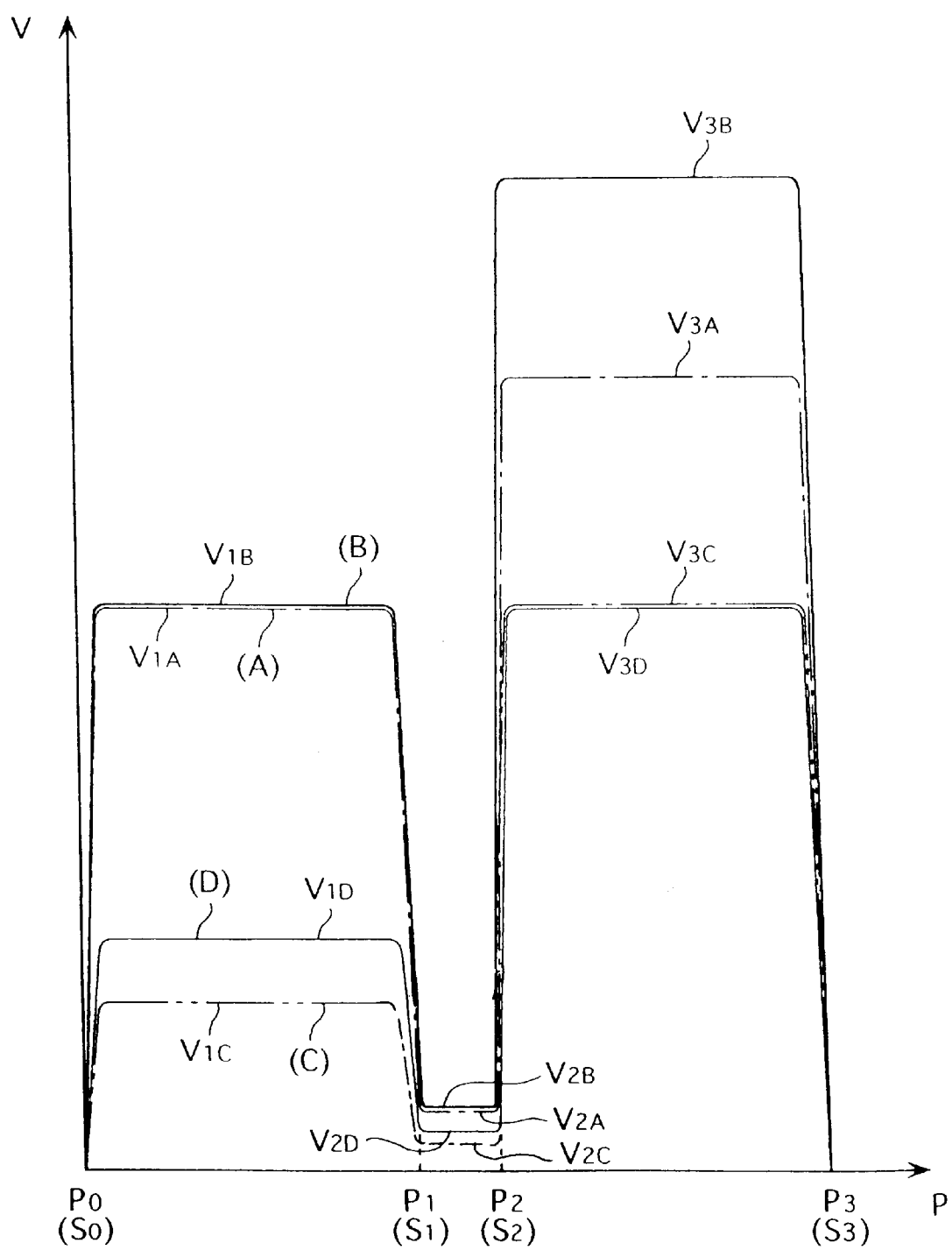
FIG. 4 is an illustration showing the relation between injection speed and position in the case of the above embodiment.

In this case, the control device 90 controls the speed V (injection speed) of the plunger 81 of the injection cylinder 82 so as to approximate to the speed shown in FIG. 4. In FIG. 4, symbol (A) denotes a case of forming a minus lens with a lens degree of −4.00 D, a central portion thickness of 1.4 mm, and a marginal portion thickness of 1.4 mm, (B) denotes a case of forming a minus lens with a lens degree of −2.00 D, a central portion thickness of 1.4 mm, and a marginal portion thickness of 4.8 mm, (C) denotes a case of forming a plus lens with a lens degree of +2.00 D, a central portion thickness of 4.2 mm, and a marginal portion thickness of 1.0 mm, and (D) denotes a case of forming a semifinished lens with a plano-convex surface base curve of 3.00, a central portion thickness of 5.4 mm, and a marginal portion thickness of 5.8 mm.

Figure 5:
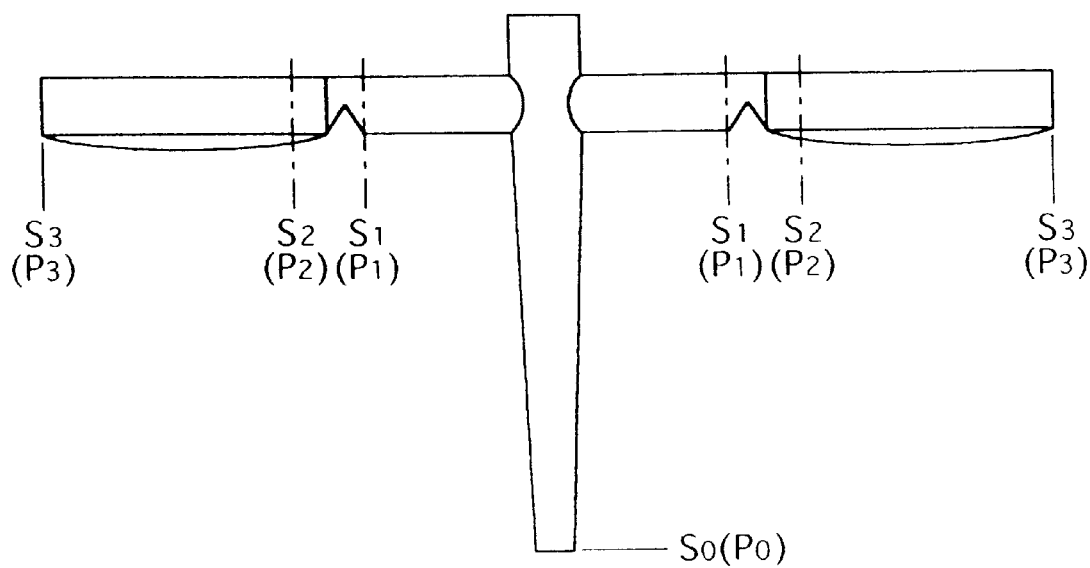
FIG. 5 is an illustration showing a molded product obtained by the above embodiment.

That is, in the case of (A), the injection speed V is controlled so that the speed V becomes equal to first set speed $V_{1A}$ in the section from the time when injection of molten resin is started up to the time when the head of the molten resin flow reaches this side of the gate portion 46 (section between $S_0$ and $S_1$ shown in FIG. 5), so that the speed V becomes equal to second set speed $V_{2A}$ in the section from the time when the head of the molten resin flow reaches this side of the gate portion 46 up to the time when the head of the molten resin flow reaches the inside of the cavity 3 (section between $S_1$ and $S_2$ shown in FIG. 5), and so that the speed V becomes equal to third set speed $V_{3A}$ in the section from the time when the head of the molten resin flow reaches the inside of the cavity 3 up to the time when injection of the molten is completed (section between $S_2$ and $S_3$ shown in FIG. 5). Similarly, in the case of (B), (C), or (D), the injection speed V is controlled so that the speed V becomes equal to first set speed $V_{1B}$, $V_{1C}$, or $V_{1D}$ in the section between $S_0$ and $S_1$, so that the speed V becomes equal to second set speed $V_{2B}$, $V_{2C}$, or $V_{2D}$ in the section between Sand $S_2$, and so that the speed V becomes equal to third set speed $V_{3B}$, $V_{3C}$, or $V_{3D}$ in the section between $S_2$ and $S_3$.

Moreover, in FIG. 4, symbol $P_0$ denotes a position of the plunger 81 when injection of molten resin is started, $P_1$ denotes a position of the plunger 81 when the molten resin reaches this side of the gate portion 46, $P_2$ denotes a position of the plunger 81 when the molten resin reaches the inside of the cavity 3, and $P_3$ denotes a position of the plunger 81 when injection of the molten resin is completed. These positions are detected by the position sensor 87. These positions $P_0$, $P_1$, and $P_2$ are previously obtained in accordance with the shape of a lens through calculation or experiments.

Figure 6:
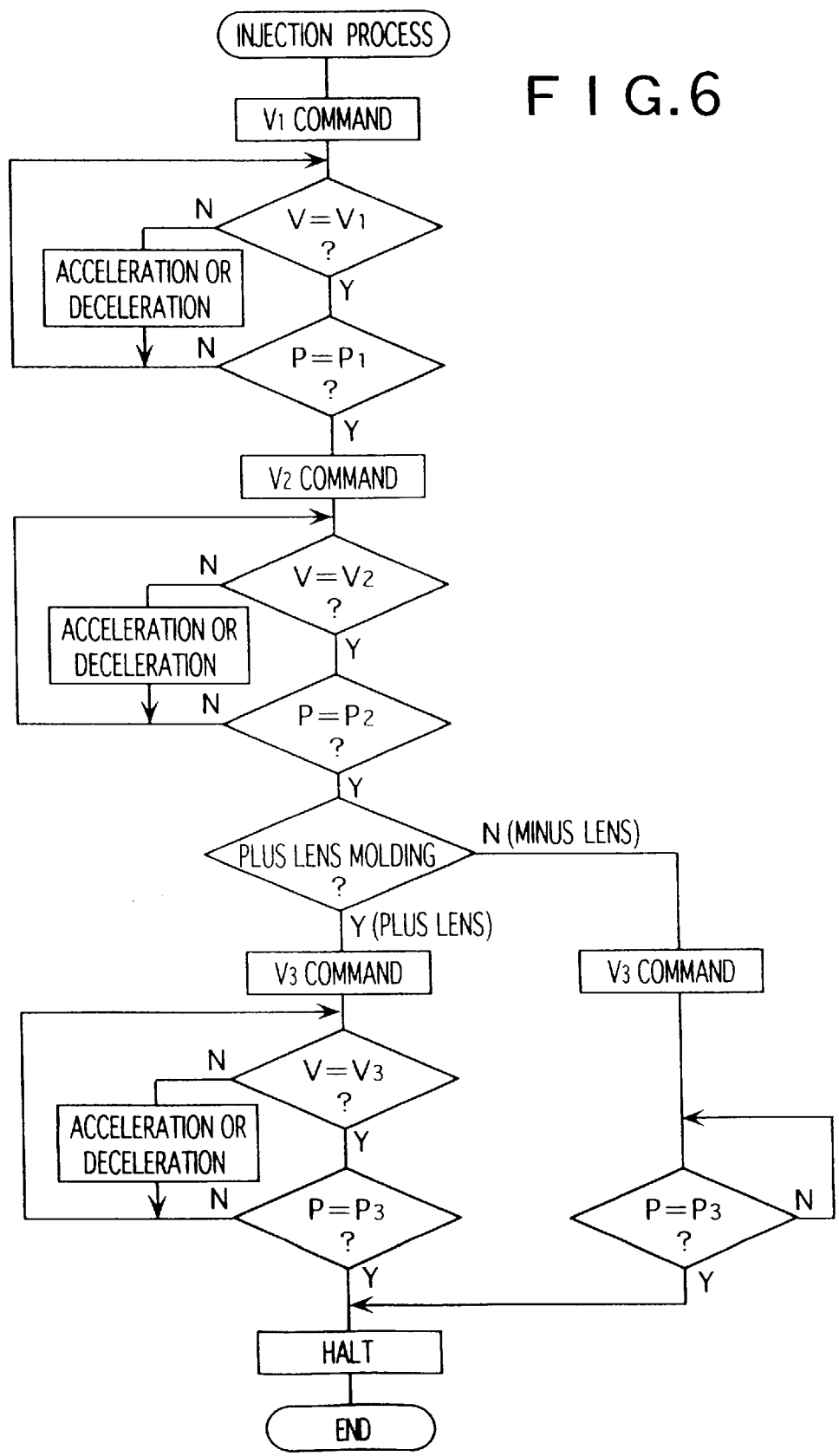
FIG. 6 is a flow chart for control of the injection process in the embodiment in FIG. 1.

Specifically, control is performed in accordance with the flow chart shown in FIG. 6. First, a command for the first set speed $V_1$ is output to the drive control circuit 84 and then, an acceleration or deceleration command is output to the drive control circuit 84 so that an actual injection speed V becomes equal to the first set speed $V_1$ while comparing speed data (actual injection speed V) sent from the speed sensor 88 with the first set speed $V_1$. At the same time as the above, it is checked whether position data P sent from the position sensor 87 reaches $P_1$ to perform the closed control so that the actual injection speed V becomes equal to the first set speed $V_1$ until the position data P reaches $P_1$. Thereby, it is possible to accurately inject molten resin up to the position $P_1$ where the molten resin reaches this side of the gate portion 46.

After the position data reaches $P_1$, that is, after the molten resin reaches this side of the gate portion 46, a command for the second set speed $V_2$ is output to the drive control circuit 84. Then, an acceleration or deceleration command is output to the drive control circuit 84 so that the actual injection speed V becomes equal to the second set speed $V_2$ while comparing speed data (actual injection speed) sent from the speed sensor 88 with the second set speed $V_2$. At the same time as the above, it is checked whether the position data P sent from the position sensor 87 reaches $P_2$ to perform the closed control so that the actual injection speed V becomes equal to the second set speed $V_2$ until the position data P reaches $P_2$. Thereby, it is possible to slowly inject the molten resin from the position $P_1$. where the molten resin reaches this side of the gate portion 46 up to $P_2$ where the molten resin reaches the inside of the cavity 3.

After the position data P reaches $P_2$, that is, after the molten resin reaches the inside of the cavity 3, it is decided whether to form a plus lens or minus lens. When it is decided to form a plus lens, a command for the third set speed $V_2$ is output to the drive control circuit 84 and then, an acceleration or deceleration command is output to the drive control circuit 84 so that the actual injection speed V becomes equal to the third set speed $V_3$ while comparing the actual injection speed V with the third set speed $V_3$. At the same time as the above, it is checked whether the position data P sent from the position sensor 87 reaches $P_3$ to perform the closed control so that the actual injection speed V becomes equal to the third set speed $V_3$ until the position data P reaches $P_3$ and stop the control when the position data P reaches $P_3$. Thereby, when forming a plus lens, it is possible to inject the molten resin while secure a high injection speed. In this case, because the central portion of the cavity 3 (central portion of the lens) has a large thickness and the molten resin reaching the inside of the cavity 3 reaches the marginal portion by passing through the central portion of the cavity 3 (central portion of the lens), it is possible to inhibit a weld mark.

When forming a minus lens, a command for the third set speed $V_3$ is output to the drive control circuit 84 (open control) and then, it is checked whether the position data P sent from the position sensor 87 reaches $P_3$ to stop the control when the position data P reaches $P_3$. That is, when forming a minus lens, a slight-opening degree S larger than 0.8 mm is set and it is possible to decrease an injection speed change while securing a high injection speed even by using the above open control because an injection resistance in a die is small. Therefore, an injection history appearing as an injection speed change on the surface of a molded product does not easily appear. Moreover, because the thickness of the central portion of the cavity 3 is set to a large value by setting a large slight-opening degree and molten resin reaching the inside of the cavity 3 reaches the marginal portion of the cavity 3 after passing through the central portion of the cavity 3 without being flow-divided, it is possible to inhibit a weld mark at the central portion and obtain a high-quality lens.

When forming a plus lens, a nozzle is closed (for the closing mechanism, see the nozzle shut mechanism disclosed in Japanese Utility Model Publication No. 27140/1995, Japanese Patent Publication No. 44893/1993, and Japanese Patent Publication No. 30608/1993 of the present applicant) and then, pressured (compressed).

However, when forming a minus lens, pressurization (compression) is started before injection of molten resin is completed. Specifically, when approx. 90 to 95% of the molten resin to be injected is injected, pressurization is started by the clamping cylinder 63. Finally, the nozzle 85 is closed.

Thus, a plus or minus lens is formed and then ejected.

Therefore, the injection compression molding method of this embodiment of injecting molten resin into the molding body 45 having the lens forming cavity 3, the runner 49 communicating with the cavity 3 through the gate portion 46, and the sprue 48 communicating with the runner 49 by the injection cylinder 82 to compression-mold a lens makes it possible to accurately inject the molten resin until the molten resin reaches the inside of the cavity 3 because the injection speed V is controlled so that the actual injection speed V becomes equal to the first or second set speed $V_1$ or $V_2$ while comparing the actual injection speed V with the preset first or second speed $V_1$ or $V_2$ in the section between $S_0$ and $S_2$ from the time when injection of the molten resin is started up to the time when the molten resin reaches the inside of the cavity 3, that is, the closed control is used.

Moreover, in the case of the closed control, the injection speed V is temporarily lowered up to the second set speed $V_2$ by the gate portion (section between $S_1$ and $S_2$) in the section from the time when injection of the molten resin is started up to the time when the molten resin reaches this side of the gate portion 46, it is possible to prevent the molten resin from suddenly entering the cavity 3. This makes it possible to compensate smooth injection of the molten resin in which the mount of suction air is minimized and the behavior of the molten resin is not greatly changed.

Furthermore, it is possible to decrease a molten-resin speed change in the cavity 3 because the injection speed V is controlled to the preset speed $V_3$ in the section between $S_2$ and $S_3$ from the time when the molten resin reaches the inside of the cavity 3 up to the time when injection of the molten resin is completed, that is, the open control is used. Therefore, it is possible to decrease the frequency of the phenomenon in which a feed history appears on the surface of a molded product. Particularly, in the case of formation of a minus lens, because the slight-opening degree S is set to a large value and an injection resistance is decreased, it is possible to decrease an injection speed change while securing a high injection speed even if the open control is used. Therefore, it is possible to decrease the frequency of the phenomenon in which a feed history appears on the surface of a molded product.

Furthermore, in this case, as shown by speed plots (A) and (B) in FIG. 4, the injection speed of an injection cylinder is controlled by changing the injection speed for forming a minus low power lens and a minus high power lens so that the injection speed for forming a minus high power lens is less than that for forming a minus low power lens. Therefore, it is possible to decrease a molten-resin speed change in the lens forming cavity 3 even when forming a minus high power lens in which the difference between the central portion thickness and the marginal portion thickness is larger than the case of a minus low power lens. It can also be seen by comparing speed plots (A) and (B) to speed plot (C) of FIG. 4 that the injection speed for molding a plus-lens is less than the injection speed for a minus-lens.

Furthermore, because compression of the slight-opening degree S is started before injection of molten resin is completed when forming a minus lens, the volume of the cavity 3 is reduced before injection of the molten resin is completed and thus, a large unfilled portion is rarely left in the cavity 3 when injection of the molten resin is completed. Therefore, it is also possible to prevent a flow mark from occurring. That is, if the slight-opening degree S is set to a large value, flow of the molten resin stops while a large unfilled portion is left in the cavity 3 when injection of the molten resin is completed and therefore, a problem is considered that a flow mark easily occurs at the critical line between filled and unfilled portions. Moreover, by using this embodiment, it is possible to prevent a flow mark from occurring.

Furthermore, it is possible to secure a high injection speed when forming a plus lens because an injection speed is controlled so that the actual injection speed V becomes equal to the third set speed $V_3$ while comparing the actual injection speed V with the third set speed $V_3$ in the section from the time when molten resin reaches the inside of the cavity 3 up to the time when injection of the molten resin is completed when forming a plus lens, that is, the closed control is used. In this connection, when forming a plus lens, the slight-opening degree S is small and a gate structure narrowed to prevent a sink mark from occurring at a gate portion is used, an injection resistance is very large and therefore, it is estimated that a high injection speed is not obtained and a high-quality molded product is not obtained when using the open control.

Furthermore, because the injection speed $V_3$ in the section (between $S_2$ and $S_3$) from the time when molten resin reaches the inside of the cavity up to the time when injection of the molten resin is completed is set to a value larger than the injection speed $V_1$ in the section (between $S_1$ and $S_1$) from the time when injection of the molten resin is started up to the time when the molten resin reaches the gate portion 46. Therefore, because the molten resin is injected at a low speed up to a position where the molten resin reaches the gate portion 46, it is possible to accurately inject the molten resin up to the position of the gate portion 46. Moreover, because the molten resin is injected at a high speed after reaching the inside of the cavity, it is possible to further decrease the frequency of the phenomenon in which a feed history appears.

The above embodiment uses the die 50 having two spectacle-lens forming cavitie $S_3$. Moreover, it is also possible to form a lens by using a die having one lens-forming cavity or three or more lens forming cavities.

Moreover, though the above embodiment uses the closed control in the section between $S_0$ and $S_2$ from the time when injection of molten resin is started up to the time when the molten resin reaches the inside of the cavity 3, it is possible to use the closed control in the section between $S_0$ and $S_1$ from the time when injection of molten resin is started up to the time when the molten resin reaches this side of the gate portion 46 and the open control in the section between $S_1$ and $S_2$ (section of the gate portion 46) from the time when the molten resin reaches this side of the gate portion 46 up to the time when the molten resin reaches the inside of the cavity 3.

Furthermore, though the above embodiment uses the speed sensor 88 in addition to the position sensor 87, it is possible to compute speed in accordance with the relation between the position data sent from the position sensor 87 and the time obtained from the position data without using the speed sensor 88.

Furthermore, though the above embodiment sets a compression margin in accordance with a slight-opening degree formed between the die body 4 and the mold attaching member 16, it is possible to use other die. For example, it is possible to use a die having a structure in which a cavity core is formed so as to protrude in the cavity 3 and a compression margin is set from the position of the cavity core to perform compression by protruding the cavity core in the cavity 3.

Furthermore, though the above embodiment sets a slight-opening degree to 0.8 mm or less for a plus lens and to a value larger than 0.8 mm for a minus lens, it is possible to optionally determine these values in accordance with the characteristic of a lens.

Furthermore, though the above embodiment starts compression of the slight-opening degree S when molten resin is injected up to 90 to 95% when forming a minus lens, it is possible to optionally determined the percentage in this case in accordance with the volume of the cavity 3, the type of resin, and the characteristic of a lens.

A lens injection- compression-molding method of the present invention makes it possible to decrease an injection speed change while securing a high injection speed because of using controlling an injection speed to a preset value in the section from the time when molten resin reaches the inside of a lens forming cavity up to the time when injection of the molten resin is completed, that is, using the open control. Therefore, it is possible to decrease the frequency of the phenomenon in which a feed history appears on the surface of a molded product and obtain a high-quality lens.

What is claimed is:

1. A method of forming a spectacle lens comprising the steps of:

providing a mold having: a cavity in which the lens is molded; two spaced-apart optical inserts disposed in the cavity for forming the lens, the optical inserts being exchangeable so as to allow the formation of different shaped lenses; a sprue through which resin is introduced into the mold; a runner extending from the sprue through which the resin flows; and a gate located between the runner and the cavity through which resin flows into the cavity;

providing an injection assembly for injecting molten resin into the mold through the sprue, the injection assembly having: a cylinder into which the molten resin is introduced; and a movable injection device located in the cylinder for forcing the resin into the mold;

injecting molten resin through the sprue into the cavity by advancing the injection device, wherein:

the injection device is advanced at a first speed when a head of the molten resin flow flows through the sprue and runner;

when the head of the molten resin flow is at the gate, the injection device is advanced at a second speed to force the resin through the gate into the cavity, the second speed being less than the first speed; and after the head of the molten resin flow enters the cavity, the injection device is advanced at a third speed to cause the resin to fill the cavity, the third speed being greater than the first speed; and compressing the molten resin in the cavity to form the lens.

2. The method of forming a lens of claim 1, wherein:

the mold is configured to mold either a plus-lens or a minus-lens; and during said molten resin injection step, the injection device is advanced at different speeds depending if the lens being molded is a plus-lens or a minus-lens, wherein the speeds at which the injection device is advanced to mold the minus-lens are greater than the speeds at which the injection device is advanced to mold the plus-lens.

3. The method of forming a lens of claim 2, wherein, when the injection device is advanced to mold the minus-lens, the speed at which the injection device is advanced is a function of the power of the lens, the injection device being advanced to mold a high-powered minus-lens at speeds less than the speeds at which the injection device is advanced to mold a low-powered minus lenses.

4. The method of forming a lens of claim 1, wherein:

the mold is configured to mold either a plus-lens or a minus-lens; and prior to said molten resin injection step, the optical inserts in the cavity are spaced apart to define a specific compression margin, the compression margin being a function of whether the lens being molded is a plus-lens or a minus-lens.

5. The method of forming a lens of claim 4, wherein: if the plus-lens is being molded, the optical inserts are spaced apart a first distance to define the compression margin; and, if the minus-lens is being molded, the optical inserts are spaced apart a second distance to define the compression margin, the second distance being greater than the first distance.

6. The method of forming a lens of claim 1, wherein:

the mold is configured to mold either a plus-lens or a minus-lens; and during the molding of the minus lens, said molten resin compression step is initiated prior to termination of said molten resin injection step.

7. The method of forming a lens of claim 1, wherein: the injection device is a plunger; and, during said step of injecting molten resin, the plunger is advanced hydraulically.

8. A method of forming a spectacle lens comprising the steps of:

providing a mold having: a cavity in which the lens is molded; two spaced-apart optical inserts disposed in the cavity for forming the lens, the optical inserts being exchangeable so as to allow the formation of different shaped lenses; a sprue through which resin is introduced into the mold; a runner extending from the sprue to the cavity through which the resin flows; and a gate located between the runner and the cavity through which resin flows into the cavity;

providing an injection device for injecting molten resin into the mold through the sprue, wherein the injection device is capable of controlling the speed at which the resin is injected into the mold;

injecting molten resin through into the mold with the injection device while varying the speed at which the molten resin is injected so that the speed at which the molten resin is injected into the mold prior to the molten resin entering the cavity through the gate is less than the speed at which the molten resin is injected into the mold to fill the cavity after the molten resin enters the cavity; and compressing the molten resin in the cavity to form the lens.

9. The method of forming a lens of claim 8, wherein, during said molten resin injection step, the speed at which the molten resin is injected into the mold is further varied so that:

when a head of the molten resin flow flows through the runner, the molten resin is injected at a first speed, the first speed being less than the speed at which the molten resin is injected into the mold when the molten resin is injected to fill the cavity; and when the head of the molten resin flow flows through the gate into the cavity, the molten resin is injected at a second speed, the second speed being less than the first speed.

10. The method of forming a lens of claim 8, wherein:

the injection device includes a movable member for injecting the molten resin into the mold; and said step of varying the speed at which the molten resin is injected is performed by varying the speed at which the movable member is advanced.

11. The method of forming a lens of claim 10, wherein: the movable member is a plunger; and in said step of injecting molten resin, the plunger is advanced hydraulically.

* * * * *